US009477051B2

(12) United States Patent
Oki et al.

(10) Patent No.: US 9,477,051 B2
(45) Date of Patent: Oct. 25, 2016

(54) OPTICAL TRANSCEIVER HAVING AUXILIARY AREA TO INSTALL MACH-ZEHNDER MODULATOR

(71) Applicant: Sumitomo Electric Industries, Ltd., Osaka-shi (JP)

(72) Inventors: Kazushige Oki, Yokohama (JP); Eiji Tsumura, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 0 days.

(21) Appl. No.: 14/705,222

(22) Filed: May 6, 2015

(65) Prior Publication Data
US 2015/0326319 A1    Nov. 12, 2015

(30) Foreign Application Priority Data

May 8, 2014   (JP) ................................ 2014-096701

(51) Int. Cl.
  *H04B 10/40*   (2013.01)
  *H04B 10/50*   (2013.01)
  *H04B 10/532*   (2013.01)
  *H04B 10/556*   (2013.01)
  *H04B 10/61*   (2013.01)
  *G02B 6/42*   (2006.01)

(52) U.S. Cl.
  CPC ................. *G02B 6/42* (2013.01); *H04B 10/40* (2013.01); *H04B 10/505* (2013.01); *H04B 10/532* (2013.01); *H04B 10/556* (2013.01); *H04B 10/5561* (2013.01); *H04B 10/613* (2013.01); *H04B 10/614* (2013.01)

(58) Field of Classification Search
  CPC .. H04B 10/40; H04B 10/505; H04B 10/532; H04B 10/556; H04B 10/5561; H04B 10/613; H04B 10/614; G02B 6/42

USPC .......................................................... 398/135
See application file for complete search history.

(56) References Cited

U.S. PATENT DOCUMENTS

| 6,782,017 | B1 * | 8/2004 | Kai ....................... H01S 5/0687 359/247 |
| 8,380,073 | B2 * | 2/2013 | Edwards .............. G02B 6/4201 398/135 |
| 2007/0154221 | A1 * | 7/2007 | McNicol ................ H04B 10/50 398/135 |
| 2010/0067854 | A1 * | 3/2010 | Oki ....................... H01R 13/748 385/92 |
| 2013/0148977 | A1 | 6/2013 | Shah et al. |
| 2014/0023368 | A1 * | 1/2014 | Bhandare ................ H04J 14/06 398/65 |
| 2015/0342075 | A1 | 11/2015 | Oki et al. |

FOREIGN PATENT DOCUMENTS

| JP | 2007-071980 A | 3/2007 |
| JP | 2012-244146 A | 12/2012 |
| JP | 2013-156438 A | 8/2013 |

* cited by examiner

*Primary Examiner* — Dalzid Singh
(74) *Attorney, Agent, or Firm* — Venable LLP; Michael A. Sartori

(57) ABSTRACT

An optical transceiver for the coherent communication system is disclosed. The optical transceiver follows the standard of the CFP transceiver and installs a wavelength tunable laser diode (LD) as a light source for the optical transmission and a local light for the optical reception; an optical modulator of the Mach-Zehnder type made of dielectric material; and an optical receiver to recover the DP-QPSK optical signal. The housing of the optical transceiver provides a front auxiliary area and a rear auxiliary area to install a slender optical modulator and to bend an inner fiber with a large radius.

13 Claims, 12 Drawing Sheets

OPTICAL TRANSCEIVER HAVING AUXILIARY AREA TO INSTALL MACH-ZEHNDER MODULATOR

BACKGROUND OF THE INVENTION

1. Field of the Invention

The present application relates to an optical transceiver, in particular, the present application relates to an optical transceiver capable of performing the coherent optical communication.

2. Background Arts

As the mass of information to be transmitted on the optical communication system, endeavors have been continuously devoted to enhance the transmission capacity not only to increase the transmission speed but to raise the modulation degree, such as the polarization modulation, the phase modulation, a combination of these two modulations, and so on. These modulations have been known as the coherent modulation technique in the wireless communication. Recently, various documents have reported to introduce the coherent modulation in the optical communication system.

The coherent modulation counts the phase of the light as one information unit. Accordingly, comparing the phase of the transmitted light with the reference light, the in-phase component and the quadrature component may be utilized as the information unit. The former (In-phase component) is a component whose phase matches with that of the reference light, while, the latter is a component whose phase is difference by 90° against that of the reference light. In the coherent modulation, the reference light is called as the local light whose frequency is precisely matched with that of the signal light, while, the phase is optional against the signal light. The optical communication system may utilize, in addition to those two components in the phase, two polarizations may be utilized as the information unit. Such a modulation is called as Dual-Polarization Dual-Phase-Shift-Keying (DP-QPSK).

The DP-QPSK modulation requests the local light to be extremely stable in the phase thereof, namely, extremely narrow linewidth of the laser emission, and to be compact as possible. In order to get the narrow line width, the optical modulation is carried out by an optical modulator independent of the LD, in particular, the coherent modulation generally introduces, what is called, the Mach-Zehender (MZ) modulator. When the MZ modulator is primarily made of dielectric material, typically lithium niobate (LN), and a substantial longitudinal length is inevitable to secure an effective electrical-to-optical interaction because of relatively smaller electro-optic effect of the material.

Most optical transceivers distributing in the field are defined in the outer dimensions and electrical interfaces thereof in respective standards. Because the optical transceivers are operated under controls by the host system, diverse outer dimensions and electrical interfaces delay the diffusion of such optical transceivers. Accordingly, a coherent optical transceiver is necessary to install a lot of optical components, compared with conventional optical transceivers adopting only the amplitude modulation, within a housing having a limited inner space.

SUMMARY OF THE INVENTION

An aspect of the present invention relates to an optical transceiver that is applicable to a coherent communication system. The optical transceiver of the present application comprises an optical receptacle, a wavelength tunable laser diode (LD), a polarization maintaining coupler (PMC), an optical modulator, an optical receiver, and a housing. The optical receptacle receives an external optical connector. The LD generates a laser light. The PMC splits the laser light output from the LD into two beams. The optical modulator modulates one of the beams split by the PMC to generate a modulated optical beam. The optical receiver recovers data contained in an optical signal externally provided through the external optical connector by multiplying another of the beams that is output from the PMC with the external optical signal. The housing encloses the optical receptacle, the LD, the PMVC, the optical modulator, and the optical receiver therein. The housing provides a front panel to mount the optical receptacle. A feature of the optical transceiver of the present application is that the housing provides a front auxiliary area protruding from the front panel where a portion of the optical modulator and a portion of the LD are installed.

BRIEF DESCRIPTION OF THE DRAWINGS

The foregoing and other purposes, aspects and advantages will be better understood from the following detailed description of a preferred embodiment of the invention with reference to the drawings, in which:

FIG. 9 illustrates the housing bottom up;

DESCRIPTION OF EMBODIMENTS

Next, some preferable embodiments according to the present application will be described. In the description of drawings, numerals or symbols same with or similar to each other will refer to elements same with or similar to each other without duplicated explanations.

Figure 1:
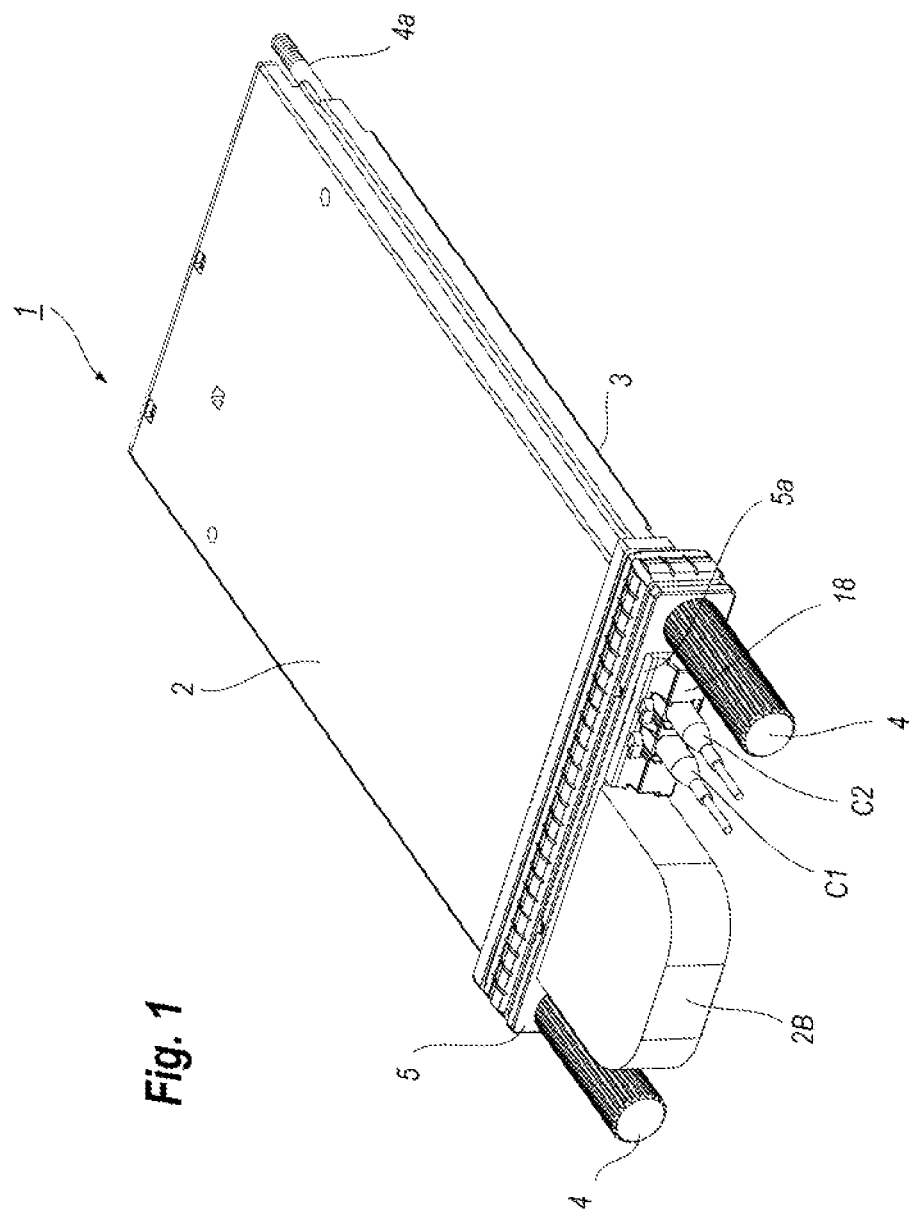
FIG. 1 shows a perspective drawing of an optical transceiver according to the present embodiment.

FIG. 1 shows a perspective drawing of an optical transceiver 1 according to the present embodiment. The optical transceiver 1, which follows the multi-source agreement (MSA) of what is called, Centium Form factor Pluggable (CFP), includes a top housing 2, a bottom housing 3, two fastening screws 4, and a front panel 5. The description below assumes that "front" or "forward" corresponds to a side where the front panel is provided, and "rear" corresponds to a side opposite to the front, and a direction from the front to the rear is longitudinal direction. However, these descriptions are only for explanation sakes and do not narrower the scope of the present invention.

The top and bottom housings, 2 and 3, which are made of metal die casting, has a longitudinal length of 144 mm from the front panel 5 to the rear end, and a width of 82 mm in the front panel 5. The fastening screws 4 are provided in respective sides of the front panel 5 to latch the optical transceiver 1 with the host system.

Figure 2:
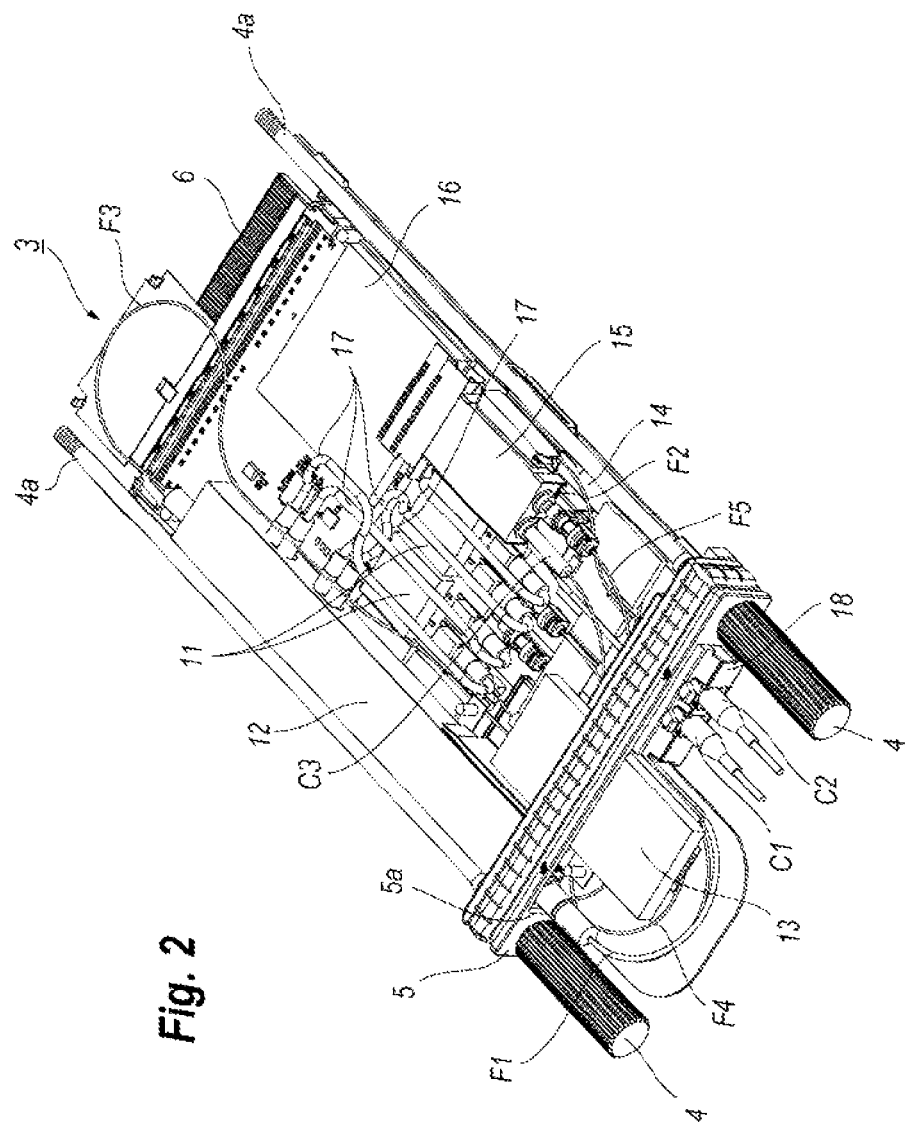
FIG. 2 shows an inside of the optical transceiver.
Figure 3:
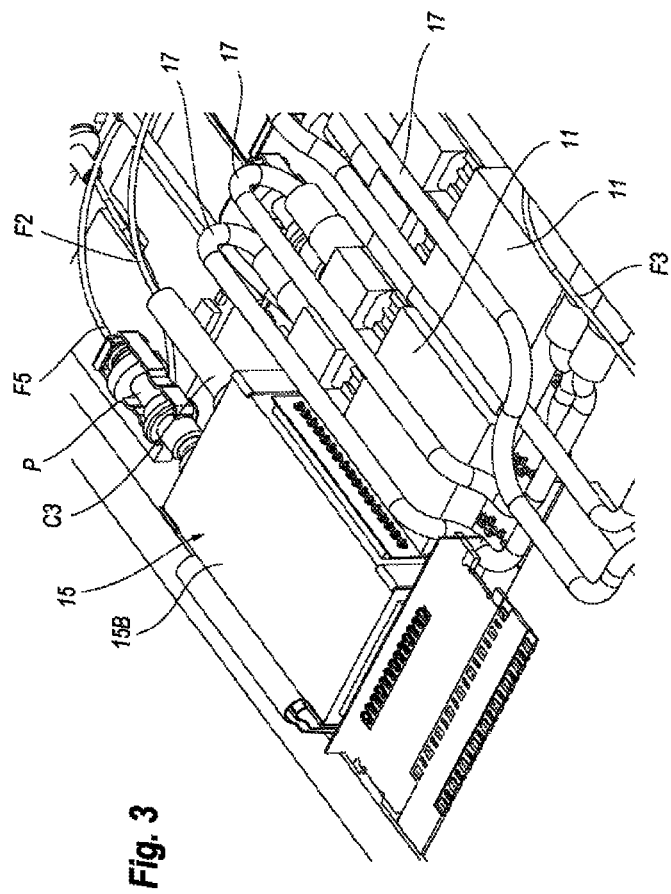
FIG. 3 magnifies a primary portion inside of the optical transceiver.
Figure 4:
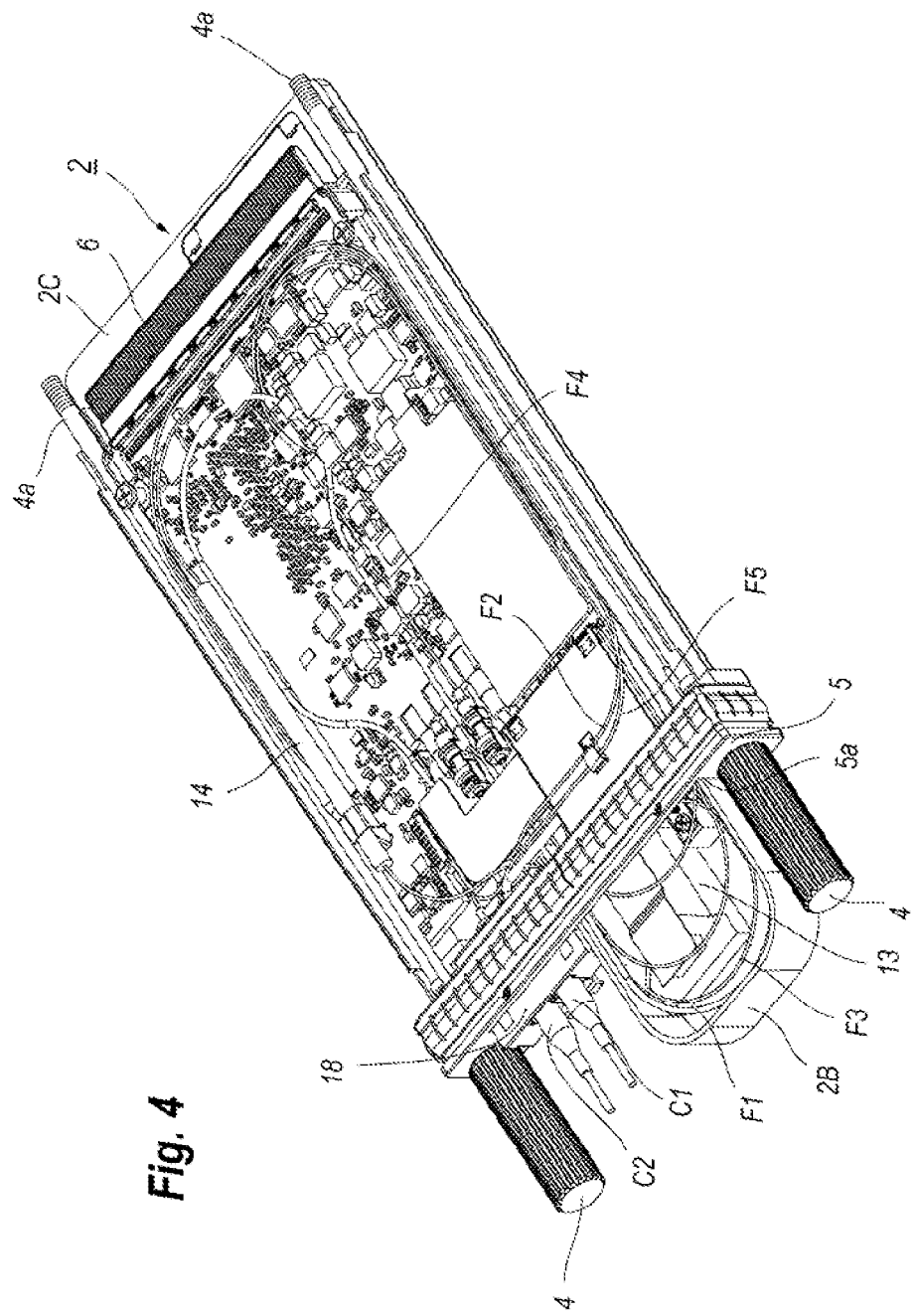
FIG. 4 views the inside of the optical transceiver from the bottom by removing the bottom housing.

FIG. 2 shows an inside of the optical transceiver 1 viewed from the top; FIG. 3 magnifies a primary portion of the optical transceiver 1; and FIG. 4 views the inside of the optical transceiver 1 from the bottom by removing the bottom housing 3. As shown in FIGS. 2 to 4, the fastening screws 4 are set in the pockets 3a appearing in FIG. 9 formed by the top and bottom housings, 2 and 3, in respective sides of the optical transceiver 1. The rear ends 4a of the fastening screws 4 extrude from the electrical plug 6 provided in the rear end of the optical transceiver 1. Mating the electrical plug 6 with an electrical connector provided in the host system, the fastening screws 4 may be fastened with the electrical connector.

Specifically, the end 4a of the fastening screw 4 extrudes in respective outer sides of the electrical plug 6 which provides terminals for radio frequency (RE) signals and those for power supplies, a total number of which exceeds 100 counts with a pitch of 0.8 mm. Mating the end 4a of the fastening screws 4 with female holes provided in respective sides of the optical connector, the optical transceiver 1 may be securely and precisely set in the host system and communicate with the host system.

Inner space formed by the top and bottom housings, 2 and 3, of the optical transceiver 1 installs two drivers 11, an optical modulator 12, an intelligent tunable laser assembly (iTLA) 13, a polarization maintaining coupler (PMC) 14, an integrated coherent receiver (ICR) 15, a digital signal processor (DSP) 16, semi-rigid cables 17, and an optical receptacle 18. Some of those elements are mounted on a circuit board. In the present optical transceiver 1, the electrical plug 6 is independent of the circuit board.

The inner space of the optical transceiver 1 installs the optical modulator 12, which has an extended and slim rectangular housing, in a side along the driver 11. Four semi-rigid cables 17 electrically connect the driver 11 with the optical modulator 12. The semi-rigid cable 17 is a co-axial cable sheathed with, for instance, copper so as to be flexibly and freely bent and to keep a bent shape. Accordingly, the semi-rigid cable 17 enhances the flexibility of the disposition of respective components within the inner space.

Also, the optical transceiver 1 provides inner fibers, F1 to F5. Five inner fibers, F1 to F5, are enclosed within the inner space in the present embodiment. These inner fibers, F1 to F5, optically couple the optical modulator 12, the iTLA 13, the PMC 14, the ICR 15, and the optical receptacle 18. Specifically, the inner fiber F1, which is forwardly brought out from the optical modulator 12 then turned rearward, couples the optical modulator 12 with the optical receptacle 18. Details of the arrangements of the inner fibers, F1 to F5, will be described later. Four optical signals modulated by the optical modulator 12 are multiplexed and output through the optical connector C1 set in the optical receptacle 18. Also, an external optical signal is input to the other optical connector C2.

The optical receptacle 18 protrudes from the front panel 5. The optical receptacle 18 is also coupled with the ICR 15 through another inner fiber F2 which extends rearward from the optical receptacle 18 and makes a round within the inner space. The external signal input to the optical connector C2 enters the ICR 15 and carried on the inner fiber F2. The iTLA 13 pierces through the opening 5a provided in the front panel 5. The PMC 14 is set in a rear of the optical receptacle 18 and in side by side against the driver 11. The DSP 16 is placed in the rear of the ICR 15. The front panel 5 in the opening 5a thereof exposes not only the iTLA 13 but the optical receptacle 18 as receiving the optical connectors, C1 and C2.

Figure 5:
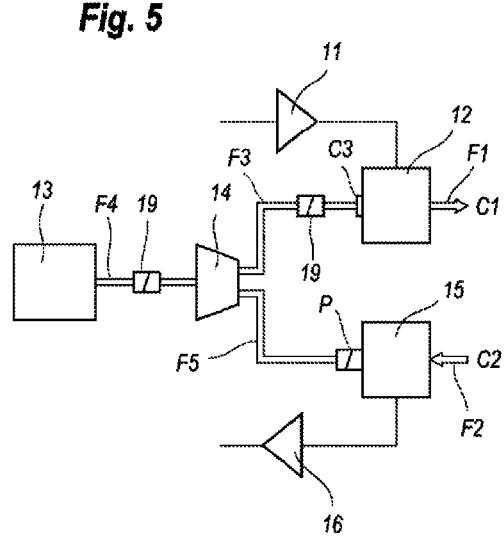
FIG. 5 schematically illustrates a functional block diagram of the optical transceiver primary in the optical system thereof.

FIG. 5 schematically illustrates a functional block diagram of the optical transceiver 1 primarily in the optical system thereof. Lines except inside thereof correspond to the optical paths, while, solid lines denote electrical paths. The iTLA 13 generates an optical signal with a wavelength within a band of 1.55 μm specifically, 1.53 to 1.57 μm.

Figure 6:
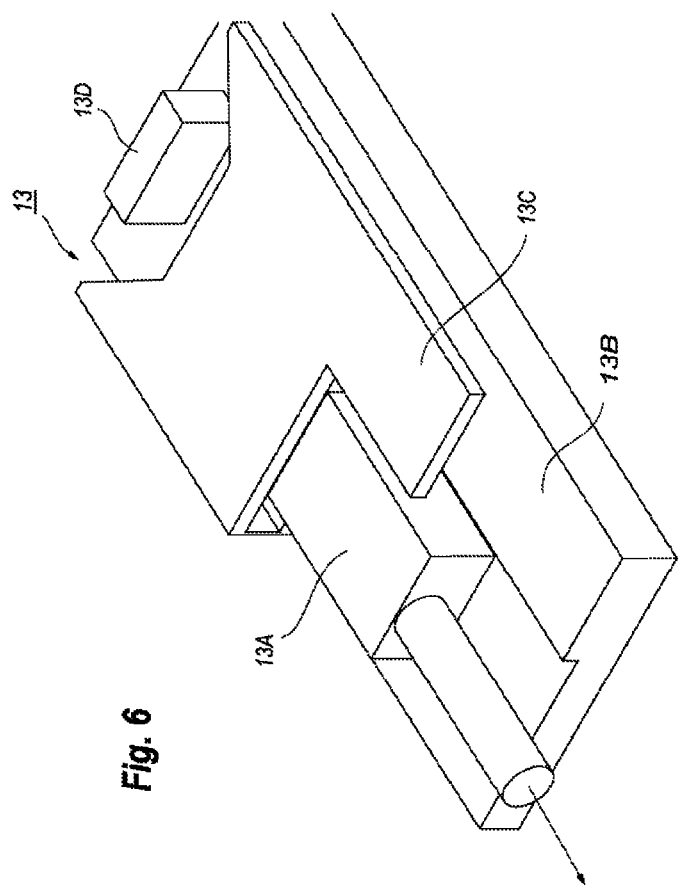
FIG. 6 is a perspective view of the iTLA.
Figure 7:
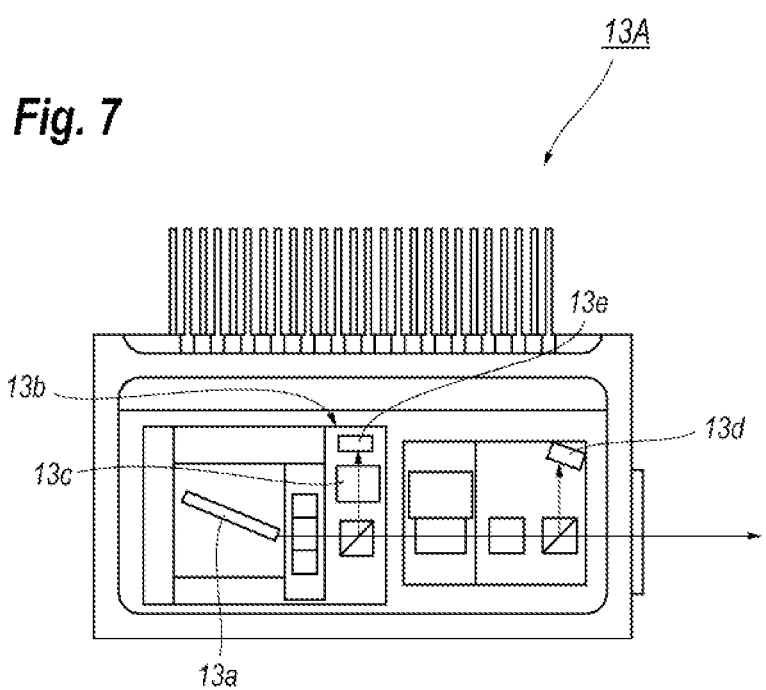
FIG. 7 schematically shows the inside of the LD module.

FIG. 6 is a perspective view of the iTLA 13. The iTLA 13 includes an LD module 13A that generates the optical signal, a base 13B, a circuit board 13C, and a connector 130. A flexible printed circuit (FPC) board coupled with the connector 130 electrically connects the iTLA with circuits mounted on the mother board in the optical transceiver 1. FIG. 7 schematically shows the inside of the LD module 13A, which installs an LD 13a, a wavelength detector 13b including an etalon filter 13c, monitor photodiodes (mPD), 13d and 13e, and so on. The LD 13a may generate laser emission with a line width thereof substantially equal to or narrower than 100 kHz. The wavelength band around 1.55 μm corresponds to the oscillation frequency of about 1.95 THz. Accordingly, the line width of around 100 kHz becomes equivalent to the stability of about $5 \times 10^{-8}$.

Referring again to FIG. 5, the local beam output from the iTLA 13 is split by the PMC 14 as maintaining the polarization thereof. The polarization of the local beam is in parallel to the active layer of the LD 13a, that is, because the LD 13a enclosed within the housing of the LD module 13A, the polarization of the local beam output from the LD module 13A is kept in substantially in parallel to the bottom of the housing. One of the local beams split by the PMC 14 enters the optical modulator 12, but the other reaches the ICR 15. The optical modulator 12, which has a type of the LN modulator comprised of lithium niobate, modulates thus provided one of local beams based on the modulation signals provided from the driver 11 through the semi-rigid cables 17. The modulation signals may have a frequency exceeding 10 GHz, sometimes reaching 40 GHz. The modulation signals thus provided correspond to Ix, Iy, Qx, and Qy, where I and Q mean the in-phase and quadrature, respectively; while, x and y correspond to the polarizations. Thus, the optical modulator 12 may perform the DP-QPSK modulation.

Figure 8:
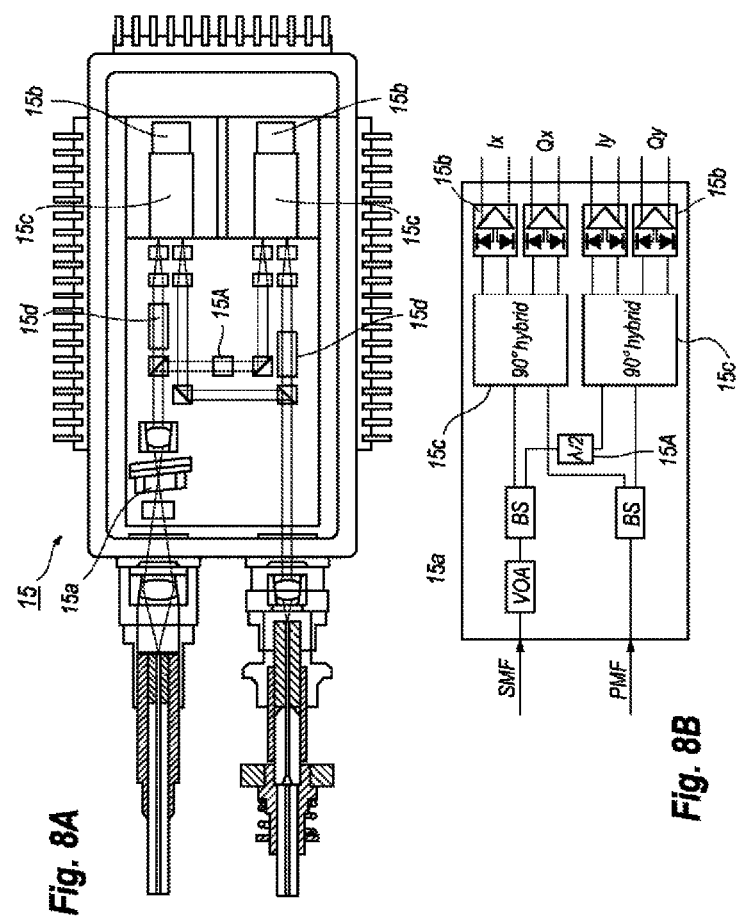
FIG. 8A schematically illustrates the inside of the ICR.
FIG. 8B shows a functional block diagram of the ICR.

The ICR 15, which receives the other of the local beams splits by the PMC 14, extracts the phase information of the input optical signal provided from the optical connector C2 by performing the multiplication of two optical beams. FIG. 8A schematically illustrates the inside of the ICR 15, and FIG. 8B is a functional block diagram of the ICR 15. As shown in FIG. 8A, the ICR 15 includes a variable optical attenuator (VOA) 15a; two PD units 15b each corresponding to respective polarizations and including two lanes for the in-phase signal (I) and the quadrature phase signal (Q), respectively; two 90° hybrids 15c to perform the multiplication of two beams; two skew adjustors 15d; and some optical components such as a polarization beam splitter (PBS), a BS, and lenses. The ICR 15 further provides a λ/2 plate 15A to rotate the polarization of the signal beam in the optical path from the signal to the local, while, the local beam provided from the polarization maintaining fiber (PMF) is kept in the polarization thereof until respective hybrids 15c.

Specifically, referring to FIG. 8B, the ICR 15 receives the local beam from the iTLA 13 through the PMF and the signal beam from the optical connector C2 through the signal mode fiber (SMF). Each beam is split into two beams by the BS and the PBS, respectively. One of the 90° hybrids 15c multiplies one of signal beams split by the PBS with one of the local beams also split but by the BS to generate the in-phase and the quadrature phase signals for the X-polarization, Ix and Qx. The other 90° hybrids 15c multiples one of the signal beams but passing through the λ/2 plate 15A with one of local beams to generate the in-phase and the quadrature phase signals for the Y-polarization, Iy and Qy. Because the optical components set in the paths for the local beam and the signal beam except for the λ/2 maintain the polarization of the local beam, respective hybrids may exactly generate the signals for two polarizations. Four generated signals, Ix to Qy, are provided to the DSP 16 to recover information contained in the input optical signal. The DSP 16 provides the information thus recovered to the host system.

The optical modulator 12, the iTLA 13, and/or the ICR 15 are necessary to be provided with a lot of DC biases for the stable operations thereof. For instance, the optical modulator 12 needs, in addition to the driving signals, biases to compensate the phases of the optical beams, to balance respective power of the optical outputs, and/or to monitor respective optical outputs. The iTLA 13 requires, in addition to the bias current to generate an optical beam, to control the wavelength of the optical beam in the target one, to monitor the power of the output beam, and so on. Also the ICR 15 is necessary to be provided with biases for PDs and pre-amplifiers installed therein, commands to adjust the gains of the pre-amplifiers, and so on. The optical transceiver 1 provides such many biases by respective FPCs from the mother board. An optical transceiver 1 for the coherent communication system is inevitably requested to enclose those electrical and optical components within a housing whose outer dimensions are precisely determined in MSAs. Next, details of the housing of the optical transceiver 1 of the present embodiment will be described.

Figure 9:
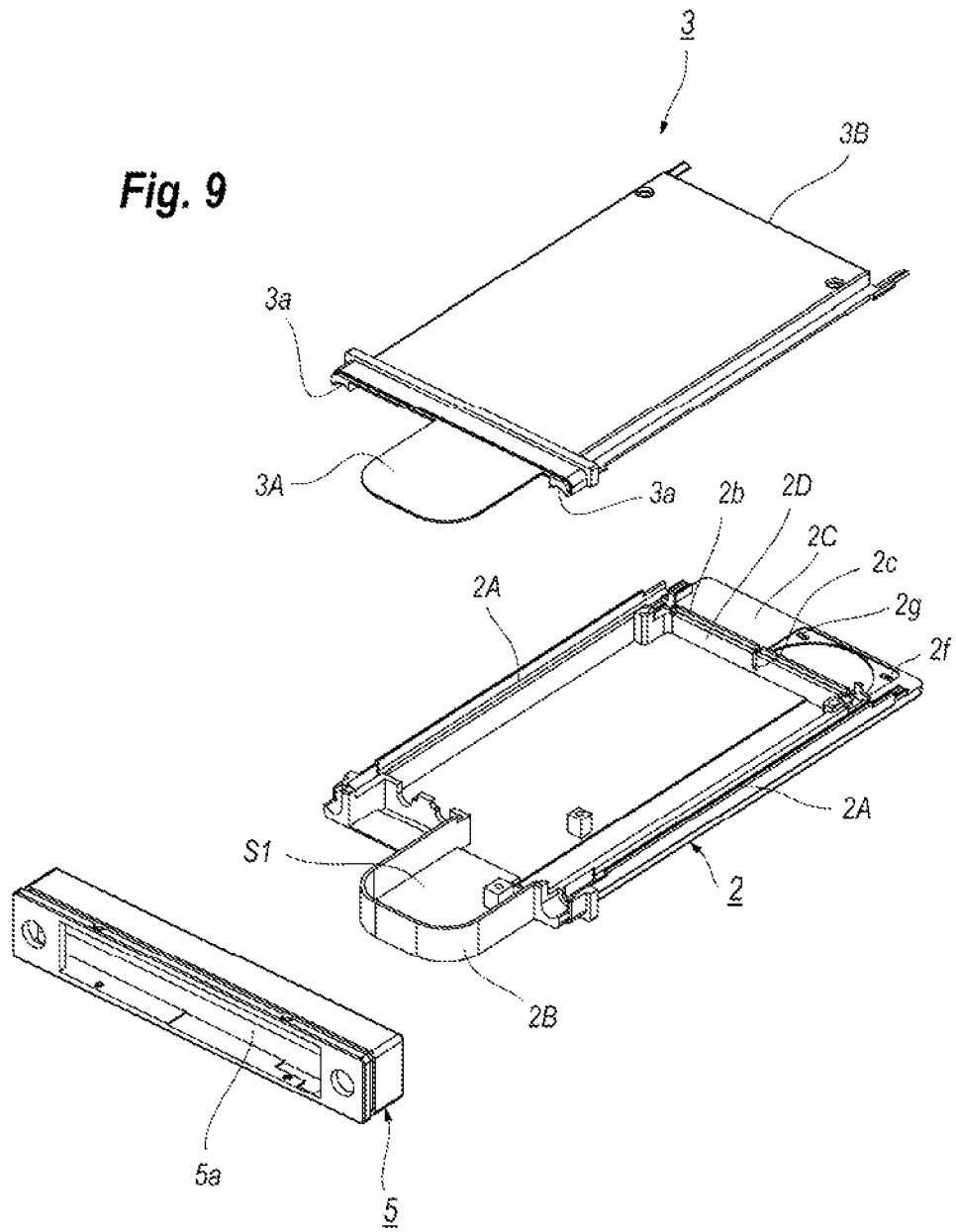
FIG. 9 is an exploded view of the housing, the top and bottom housings, and the front panel, where

FIG. 9 is an exploded view of the housing, namely, the top and bottom housings, 2 and 3, and the front panel 5, where FIG. 9 illustrates the housing in bottom up. The top housing 2 provides in respective sides the cavities 2A from the front to the rear to set the fastening screws 4 therein. The fastening screws 4 pierce the front panel 5, the cavities 2A, and protrude from the rear end. The top housing 2 also provides an extension 2B extending forward from the opening 5a of the front panel 5. The extension 2B secures a front auxiliary area S1 covered with a ceiling 3A of the bottom housing 3. Although the extension 2B protrudes from the front panel 5, the extension 2B does not interfere with the installation of the external fiber extracted from the optical connectors, C1 and C2.

Figure 10:
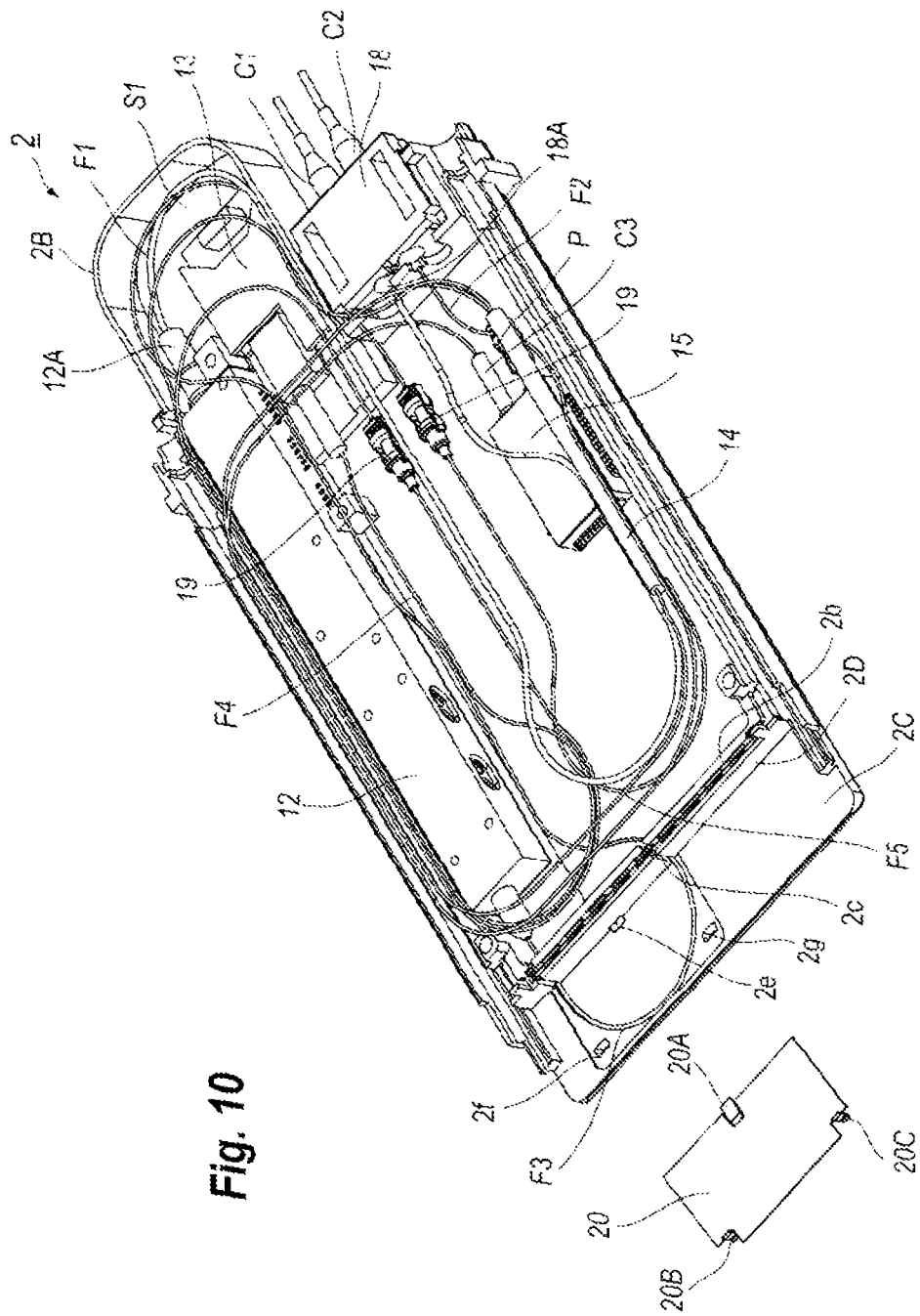
FIG. 10 illustrates the arrangement of the components and the wiring of the inner fibers within the space.

FIG. 10 illustrates the arrangement of the components and the wiring of the inner fibers within the housing 2. The front auxiliary area S1 installs the front portion of the optical modulator 12. Accordingly, even when the optical modulator 12 in the dimensions thereof, in particular, the longitudinal length thereof, is longer than the longitudinal length of the optical transceiver 1 whose outer dimensions follows the CFP standard, the optical transceiver 1 may build an optical modulator of the MZ type primarily made of dielectric material such as lithium niobate (LiNbO$_3$). Because of smaller electrical-optical interactive co-efficient of dielectric materials, an optical modulator made of such material requires a length to show a substantial modulation degree. Without the front auxiliary area S1, no optical modulator of the MZ type made of dielectric material is available to be installed within the optical transceiver following the CFP standard. Moreover, the front auxiliary area S1, or the front extension 28, does not interfere with the function for the optical transceiver 1 to be plugged within the host system and communicate therewith. That is, the CFP standard is silent for the arrangement of the front panel, only sets the limitation that the optical connector provided in a CFP transceiver is to have the type of the LC connector. Accordingly, the optical transceiver 1 of the present embodiment is an exclusive solution to install an optical modulator with the MZ type primarily made of dielectric materials.

Figure 11:
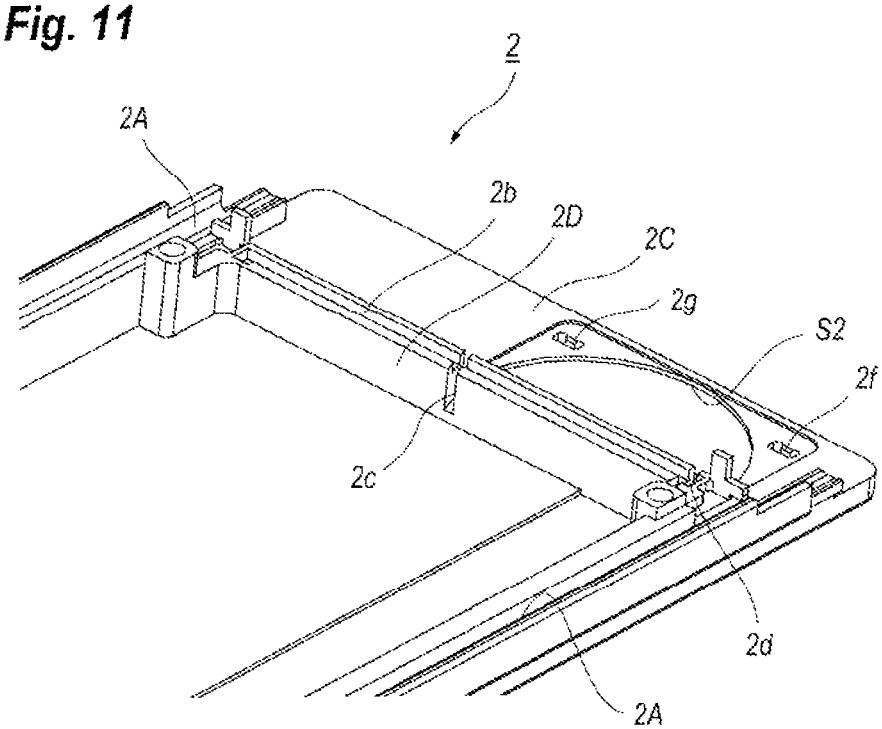
FIG. 11 magnifies the rear portion of the top housing.

The top housing 2 provides in a rear end thereof a rear wall 2D and an eaves 2C extending outwardly from the rear wall 2D. The rear wall 2D faces the rear end 3B of the bottom housing 3 as shown in FIG. 9. That is, the rear wall 20, and the top and bottom housings, 2 and 3, form the inner space to install the components therein. Referring to FIG. 11, which magnifies the rear portion of the top housing 2, the rear wall 20 sets the electrical plug 6 thereon. As described later, the electrical plug 6 does not interfere with the wiring of the inner fiber F3 extracted from the rear wall 20 and returning back into the inner space of the optical transceiver 1.

The rear wall 2D also provides a groove 2b on a top thereof into which a gasket is set to shield the inner space, and two slits, 2c and 2d, in a center and a side thereof, respectively. The side slit 2d is formed in a position just behind the optical modulator 12. Referring to FIG. 10, the inner fiber F3 passes these slits, 2c and 2d. Specifically, the inner fiber F3 pulled out from the optical modulator 12 passes the rear wall 2D through the side slit 2d, rounded in the rear auxiliary area S2 returns back to the inner space passing through the center slit 2c, and reaches the PMC 14 from the rear after running along the optical modulator 12 frontward, turned backward in the front auxiliary area S1, passing the inner connector 19, and turned again frontward. Another inner fiber F4 extracted from the iTLA 13 rearward reaches the PMC 14 from the front by rounding twice the optical modulator 12.

The inner fiber F5, which extends from the PMC 14 rearward, crosses laterally in the rear end of the inner space, runs frontward between the optical modulator 12 and one of the side walls, turns rearward in the front auxiliary area S2, and finally reaches the plug P provided in the front wall of the ICR 15. The inner fiber F2, extracted rearward from the optical connector C2, rounds the inner space and reaches the other connector C3 also provided in the front wall of the ICR 15.

The last inner fiber F1, which is extracted rearward from the other optical port 18A of the optical receptacle 18, reaches the optical modulator 12 from the front by being rounded in the rear of the inner space, running in the center thereof, and rounded again rearward in the front auxiliary area S2. That is, the inner fiber F1 reaches the optical modulator 12 from the port 18A as shaping an S-character. Two inner fibers, F3 and F4, which are coupled with the PMC 14, provide respective inner connectors 19. Moreover, the inner fiber F5, which is also coupled with the PMC 14, has the plug P in the end to the ICR 14 to maintain the polarization direction thereof. Thus, the PMC 14 may be easily replaced by detaching respective connectors.

Figure 12:
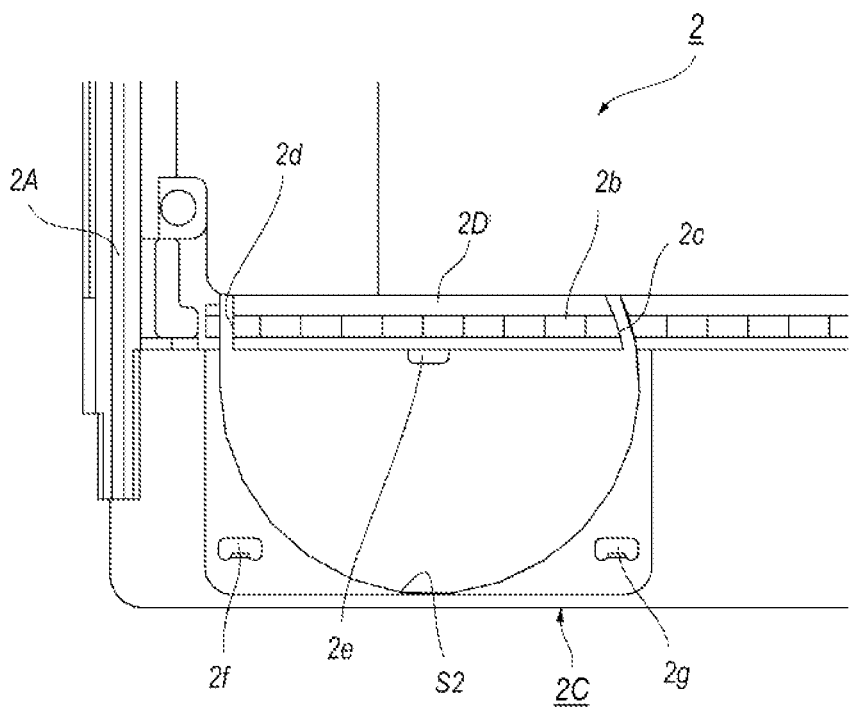
FIG. 12 is a plan view of the rear portion illustrated in FIG. 11.

The optical transceiver 1 of the embodiment further provides a cover 20 to cover the rear auxiliary area S2 into which the inner fiber F3 is set. The inner fiber F3, which passes the rear wall 2D through the side slit 2d behind the optical modulator 12, rounds along the periphery of the rear auxiliary area S2 and returns the inner space as passing through the center slit 2c. The cover 20 covers the inner fiver F3 in the rear auxiliary area S2. The cover 20 is assembled with the top housing 2 by engaging three latches, 20A to 20C, with three holes, 20e to 20g, provided in the extension 2C of the top housing 2, as shown in FIGS. 11 and 12, where FIG. 11 is a perspective view of the rear of the top housing and FIG. 12 is a plan view thereof.

The extension 2C of the top housing 2 provides a hollow corresponding to the shape of the rear auxiliary area S2. The hollow has a diameter greater than 15 mm, which is a smallest diameter allowable for an ordinary single mode fiber. Setting the inner fiber F3 along the periphery of the area S2, the round diameter of the inner fiber F3 automatically becomes greater than 15 mm. The bent loss of the inner fiber F3 may be thus suppressed.

The optical transceiver 1 of the present embodiment thus described provides the front auxiliary area S1 protruding from the front panel 5. The front auxiliary area S2 installs the front portion of the optical modulator 12 and that of the iTLA 13. In particular, because the optical modulator having an enough longitudinal dimension to secure the electrical to optical interaction of the dielectric material may be partially set within the front auxiliary area S1, the optical transceiver 1 may be applicable for the coherent communication system. Also, the inner fibers, F1 to F5, are rounded in the front auxiliary area S1, the installation of the inner fibers, F1 to F5, may be effectively carried out without causing unnecessary bending stress in the inner fibers, F1 to F5.

Also, the optical transceiver 1 of the present embodiment provides the rear auxiliary area S2 in the outside of the rear wall 2D. The rear auxiliary area S2 may provide a space to set and round the inner fiber F3 there by a bending diameter greater than 15 mm. The inner fiber F3 passes the side slit 2d behind the optical modulator 12, rounds along the periphery of the auxiliary area S2, and passes the rear wall 2D again through the center slit 2c. Thus, the auxiliary area S2 may secure the bending diameter greater than 15 mm. The inner fiber F3 in the rear auxiliary area S2 may be securely protected by the cover 20.

In the foregoing detailed description, the method and apparatus of the present invention have been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. An optical transceiver applicable to a coherent communication system, comprising:
    an optical receptacle to receive an external optical connector;
    a wavelength tunable laser diode (LD) to generate a laser light;
    a polarization maintaining coupler (PMC) to split the laser light into two beams;
    an optical modulator to modulate one of the beams and to generate modulated optical beam;
    an optical receiver to recover data by multiplying another of the beams output from the PMC with an external optical signal provided through the external optical connector; and
    a housing that encloses the optical receptacle, the LD, the PMC, the optical modulator and the optical receiver therein, the housing providing a front panel to mount the optical receptacle, wherein the housing provides a front auxiliary area protruding from the front panel.

2. The optical transceiver of claim 1,
    wherein the optical modulator has a type of the Mach-Zehnder (MZ) modulator made of lithium niobate.

3. The optical transceiver of claim 1,
    wherein the optical modulator outputs an optical signal of a type of a dual-polarization quadrature phase shift keying (DP-WPSK) to the optical receptacle.

4. The optical transceiver of claim 1, further including inner fibers to optically couple the LD with the PMC, and to optically couple the PMC with the optical modulator and the optical receiver, wherein the inner fibers are a type of a polarization maintaining fiber (PMF).

5. The optical transceiver of claim 4,
    wherein the inner fiber coupling the LD with the PMC and the inner fiber coupling the PMC with the optical modulator provide respective inner connectors of a type of a polarization maintaining connector.

6. The optical transceiver of claim 4,
    wherein the optical receiver provides a polarization maintaining plug for the inner fiber coupling the PMC with the optical receiver.

7. The optical transceiver of claim 4,
    wherein the housing provides a top housing, a bottom housing, and a rear wall for forming an inner space to install the LD, the PMC, the optical modulator, and the optical receiver therein,
    wherein the housing further provides a rear auxiliary area outside of the rear wall to set one of inner fibers thereat.

8. The optical transceiver of claim 7,
    wherein the rear wall provides two slits, the inner fibers set in the rear auxiliary area extracting from the inner space by passing through one of slits, rounding at the rear auxiliary area, and entering in the inner space by passing through another slit.

9. The optical transceiver of claim 8,
    wherein the rear auxiliary area provides a hollow, the inner fiber set in the auxiliary area being rounded along a periphery of the hollow.

10. The optical transceiver of claim 7,
    wherein the inner fiber set in the rear auxiliary area is protected by a cover assembled with the housing.

11. The optical transceiver of claim 7,
    further comprising a circuit board and a plug board independent of the circuit boards, the circuit board mounting electronic circuits to supply biases to the optical modulator, the LD, and the optical receiver, the plug board being mated with an electrical connector provided in a host system communicating with the optical transceiver.

12. The optical transceiver of claim 11,
    wherein the top housing and the bottom housing put the plug board at the rear wall, and
    wherein the rear wall provides a groove on a top thereof, the groove setting a shield gasket therein to shield the inner space.

13. The optical transceiver of claim 11,
    wherein rear auxiliary area faces the plug board.

* * * * *